United States Patent
Cameli et al.

[15] 3,674,754
[45] July 4, 1972

[54] VULCANIZABLE ETHYLENE/PROPYLENE COPOLYMERS AND PROCESS FOR THEIR PREPARATION

[72] Inventors: Nazzareno Cameli; Paolo Longi; Alberto Valvassori, all of Milan, Italy

[73] Assignee: The B. F. Goodrich Company, Akron, Ohio

[22] Filed: Sept. 4, 1970

[21] Appl. No.: 69,987

[30] Foreign Application Priority Data

Sept. 5, 1969 Italy.................................21674 A/69

[52] U.S. Cl......................................260/79.5 B, 260/80.78
[51] Int. Cl. .........................................................C08f 15/40
[58] Field of Search..................................260/80.78, 79.5 B

[56] References Cited

UNITED STATES PATENTS 3,554,988  1/1971  Emde...................................260/80.78

FOREIGN PATENTS OR APPLICATIONS 1,023,709  3/1966  Great Britain

Primary Examiner—Joseph L. Schofer
Assistant Examiner—Roger S. Benjamin
Attorney—Ernest K. Bean and J. Hughes Powell, Jr.

[57] ABSTRACT

There are disclosed new vulcanizable copolymers of ethylene and propylene containing unsaturations resulting from the presence therein of units deriving from the mixture obtained by the catalytic isomerization of vinylnorbornene said copolymers containing ethylene, propylene, ethylidene norbornene and at least one other diene selected from the group consisting of vinyl norbornene and vinyl norbornene and dicyclopentadiene. The copolymers have vulcanization rates comparable to those of ethylene/propylene/ethylidenenorbornene copolymers and yield elastomers having characteristics comparable to those of the vulcanized ethylene/propylene/ethylidenenorbornene copolymers, but are substantially more economical.

The new modified ethylene/propylene copolymers are obtained by copolymerizing a mixture of the starting monomers in contact with catalysts prepared from hydrocarbon-soluble vanadium compounds and hydrides or organometallic compounds of beryllium, aluminum, or lithium-aluminum compounds.

8 Claims, No Drawings

VULCANIZABLE ETHYLENE/PROPYLENE COPOLYMERS AND PROCESS FOR THEIR PREPARATION

THE PRIOR ART

Italian Pat. No. 816,508 discloses and claims ethylene/propylene/ethylidenenorbornene copolymers prepared with the aid of catalysts soluble or highly dispersible in the liquid polymerization medium. Said copolymers, even at low (1.5 – 2 percent by weight) unsaturations content, are easily vulcanizable by conventional methods and have particularly high vulcanization rates.

However, the ethylidenenorbornene used as third monomer in preparing the copolymers is obtained by catalytic isomerization of vinylnorbornene, which is in turn obtainable by a Diels-Adler type reaction between cyclopentadiene and butadiene. After the isomerization, the ethylidenenorbornene is isolated in a pure state by fractional distillation.

THE PRESENT INVENTION

One object of this invention was to provide elastomeric ethylene/propylene copolymers having vulcanization rates similar to those of the ethylene/propylene/ethylidenenorbornene copolymers, and vulcanizable to elastomers having characteristics similar to those possessed by the vulcanized ethylene/propylene/ethylidenenorbornene copolymers, but which would be far more economical than the known copolymers and vulcanizates thereof.

That and other objects are achieved by the invention in accordance with which there is used, as dienic comonomer, and instead of the costly pure ethylidenenorbornene, the isomerization mixture of ethylidenenorbornene and unreacted vinylnorbornene resulting from the catalytic isomerization of the vinylnorbornene and after removal of the catalytic and polymeric residues from the crude mixture.

Moreover, we have found that the same results are obtainable when the mixture of ethylidenenorbornene and unreacted vinylnorbornene also contains fractions coming from the distillation of the Diels-Adler reaction product between cyclopentadiene and butadiene. In the latter case, the mixture of dienes used in the copolymerization with ethylene and propylene is predominantly formed, besides of ethylidenenorbornene and vinylnorbornene, also of dicyclopentadiene and of 4, 7, 8, 9-tetrahydroindene.

Other diene mixtures useful for preparing the ethylene/propylene copolymers containing unsaturations are those which, however obtained, contain, in addition to the isomerization product of pure vinylnorbornene consisting of a mixture of ethylidenenorbornene and unreacted vinylnorbornene, also suitable quantities of dicyclopentadiene and/or tetrahydroindene.

Since the polymerization rates of dicyclopentadiene, of ethylidenenorbornene, and of vinylnorbornene in the presence of ethylene and propylene are fully equivalent, use of the mixtures disclosed herein instead of pure ethylidenenorbornene does not complicate the copolymerization reaction.

By using the mixtures in accordance with this invention, a very substantial economic advantage is realized because it eliminates the necessity for the burdensome isolation of the pure ethylidenenorbornene and permits replacement of a portion of the ethylidenenorbornene by other much less costly dienes such as dicyclopentadiene and/or vinylnorbornene.

The copolymers of the invention are obtained by contacting the mixture of monomers with halogen-containing catalysts which are soluble or highly dispersible in the liquid polymerization medium, and prepared by mixing a. a hydride or organometallic compound of beryllium, aluminum, or lithium-aluminum, for instance aluminum trialkyls, lithium-aluminum tetraalkyls, beryllium alkyl chlorides, aluminum-alkyl mono-, di- or sesqui-chlorides, aluminum phenyl bromides, lithium-aluminum-monofluorotrialkyls, beryllium phenyl iodide, etc., with b. a hydrocarbon-soluble vanadium compound, for instance vanadium halides and oxyhalides, vanadium and vanadyl alcoholates, vanadium and vanadyl acetylacetonates, vanadium and vanadyl halogenalcoholates and halogenacetylacetonates, complexes obtained from vanadium halides and oxyhalides with Lewis bases, etc.

Preferred catalysts are those in which at least one of components (a) or (b) contains halogen.

The copolymerization is carried out in liquid phase, either in the presence or absence of solvents of the polymer formed. Suitable solvents include for instance:
aliphatic hydrocarbons, aromatic hydrocarbons, cycloaliphatic hydrocarbons.

There may also be used chlorinated hydrocarbons which do not react with the catalysts used, such as, for instance, chlorobenzene, tetrachloroethylene, methyl chloride, etc.

The copolymerization is conducted at temperatures comprised between $-80°$ C and $+125°$ C since within this specific range the aforementioned catalysts display the greatest activity and stability.

Operating in the absence of solvents, the liquid polymerization medium consists predominantly of the liquified ethylene/propylene mixture in which the copolymer formed is not soluble. In this case the polymerization will be carried out "in suspension."

In order to obtain copolymers having a high homogenity of composition, it is necessary to maintain the ratio between the concentrations of the monomers in the liquid polymerization medium constant throughout the copolymerization reaction. By varying said ratios, the composition of the copolymers may be varied within a wide range. The preferred molar ratios between ethylene and propylene, in the liquid phase, in order to obtain amorphous polymers containing from about 20 percent to 85 percent in moles of ethylene, are comprised between 1:200 and 1:4. By using ratios greater than 1:4, in general there are obtained polymers which show a crystallinity of the polyethylenic type. The preferred propylene content is comprised between 50 percent and 15 percent in moles; the dienes content is comprised between 0.1 percent and 20 percent in moles.

The preferred molar ratio between ethylidenenorbornene and the sum of dicyclopentadiene+vinylidenenorbornene in the copolymers is comprised between 5:1 and 1:5, although good vulcanizability characteristics are also achieved when the value of the above-mentioned ratio is comprised between 10:1 and 1:10.

Since the composition of the mixture of dienes varies, both with variations in the conditions under which the vinylnorbornene is synthesized (for instance: temperature and cyclopentadiene/butadiene molar ratio), as well as with variations in the conditions of the isomerization of the vinylnorbornene to ethylidenenorbornene, it is of considerable practical importance, in consideration of what has been discussed herein, to be able to obtain vulcanized copolymers having essentially constant properties even when the diene mixtures having different compositions are used to introduce the unsaturations into the copolymers.

The copolymers of this invention have a linear structure, that is, they are free of long branchings, as is proved by the fact that their properties, in particular their viscous behavior, are practically equal to those of the known linear ethylene/propylene copolymers.

The copolymers have molecular weights in general exceeding 20,000, that is, they have intrinsic viscosities, determined in tetrahydronaphthalene at 135° C (or in toluene at 30° C), greater than 0.5 dl/g.

At unsaturations contents above 0.4 percent in moles, the copolymers obtained are easily vulcanizable by the usual vulcanization methods as for instance with sulphur, accelerators and carbon black.

In the following examples there have been indicated a few vulcanization speeds. From these examples it appears clearly that the vulcanized copolymers possess excellent mechanical and elastic properties fully comparable to those of the best ethylene/propylene/ethylideneinorbornene copolymers. Because of these properties, the copolymers are useful in all those fields in which natural rubber and other synthetic rubbers are used, since they can easily replace both natural rubber and other known synthetic rubbers.

The following examples are given to further illustrate this invention and are not intended to be limiting.

EXAMPLE 1

The reaction apparatus was a glass cylinder having a diameter of 10 cm and a capacity of 4,000 ccs. It was equipped with a stirrer, a thermometer and with gas inlet and outlet pipes.

The gas in-flow pipe reached the bottom of the reaction vessel and terminated in a porous section. Into this apparatus, kept at −20° C by immersion in a thermostatic bath, there were introduced:

3,000 cc of n-heptane, 0.3 millimoles of diethyl zinc and 4 cc of a mixture consisting for 75 percent of ethylidenenorbornene and for 25 percent of vinylnorbornene.

Through the gas inlet pipe was then introduced a propyleneethylene mixture with a molar ratio of 2:1, which was circulated at a rate of 1,200 Nl/hr. After 30 minutes of saturation, 7.5 millimoles of diethyl aluminum chloride and 0.25 millimoles of vanadyl diacetylacetonate dissolved in 20 cc of toluene were introduced into the reactor. During the run, the propylene-ethylene mixture was continuously fed in and discharged at a rate of 1,200 Nl/hr. After 30 minutes from the introduction of the catalyst, the reaction was stopped by the addition of 10 cc of methanol.

The product was then purified in a separatory funnel by means of repeated washings with diluted hydrochloric acid and successively with water and was finally coagulated with an acetone-methanol mixture.

After drying under vacuum, there were obtained 58 g of a solid product, amorphous on X-ray examination and having the aspect of an unvulcanized elastomer. It was completely soluble in boiling n-heptane.

On infrared spectrographic analysis, the product was found to contain, by weight 32 percent of propylene, 3 percent of ethylidenenorbornene and 0.8 percent of vinylnorbornene. The inherent viscosity of the copolymer was 1.9 dl/g (measured in tetrahydronaphthalene at 135° C; concentration: 0.25 g of polymer in 100 cc of solvent).

The Mooney viscosity (ML-4 at 100° C) amounted to 98.

100 parts by weight of the copolymer were mixed with 80 parts of ISAF carbon black, 55 parts of Flexon 766 oil, 1 part of stearic acid, 5 parts of zinc oxide, 0.75 part of mercaptobenzothiazol, 1.5 parts of tetramethylthiuramemonosulphide and 1.5 parts of sulphur.

This mix was then vulcanized in a press at 150° C for different vulcanization times. The properties and characteristics of the vulcanized products are indicated in Table I.

TABLE I

| Time, in minutes: | 15 | 30 | 60 | 90 | 120 | 180 | 240 |
|---|---|---|---|---|---|---|---|
| Breaking load, in kg/sq. cm | 246 | 238 | 210 | 170 | 200 | 203 | 209 |
| Elongation at break, % | 690 | 500 | 425 | 375 | 400 | 390 | 390 |
| Elastic modulus at 200% in kg/sq.cm | 25 | 50 | 60 | 70 | 68 | 64 | 64 |
| Elastic modulus at 300% in kg/sq. cm | 53 | 94 | 120 | 132 | 137 | 138 | 139 |
| Residual set, in % | 14 | 23 | 12 | 11 | 10 | 8 | 8 |

As appears from the above data, the degree of maximum reticulation (deducible from the values of the modulus) is attained after about 90 minutes; after 60 minutes the degree of reticulation amounted to about 90 percent of the maximum value.

EXAMPLE 2

Example 1, was repeated, except that there were used 4 cc of a mixture of dienes consisting of:

ethylidenenorbornene (45 percent), dicyclopentadiene (38 percent), vinylnorbornene (8 percent), vinylcyclohexene (4 percent) and 4, 7, 8, 9-tetrahydroindene (5 percent).

Thereby were obtained 53 g of amorphous polymer containing, by weight, 31 percent of propylene, 1.3 percent of dicyclopentadiene, 2 percent of ethylidenenorbornene and 0.4 percent of vinylnorbornene. The inherent viscosity amounted to 2 dl/g, while the Mooney viscosity was 95.

The copolymer was vulcanized with the same mixture and under the same conditions as in Example 1. The properties and characteristics of the vulcanized products are indicated in Table II.

TABLE II

| Time, in minutes | 15 | 30 | 60 | 90 | 120 | 180 | 240 |
|---|---|---|---|---|---|---|---|
| Breaking load, kg/sq cm | 232 | 237 | 238 | 228 | 239 | 223 | 221 |
| Elongation at break, in % | 790 | 620 | 505 | 460 | 470 | 450 | 440 |
| Elastical modulus at 200% (kgcm$^2$) | 26 | 36 | 52 | 56 | 55 | 55 | 61 |
| Elastical modulus at 300% (kg/cm$^2$) | 46 | 71 | 105 | 114 | 113 | 116 | 115 |
| Residual set, in % | 42 | 28 | 20 | 17 | 16 | 12 | 14 |

As appears from Table II, the degree of maximum reticulation is attained after about 90 minutes; after 60 minutes the degree of reticulation corresponds to about 90 percent of the maximum value.

EXAMPLE 3

Example 1 was repeated, with a molar ratio, propylene-ethylene, equal to 3:1, and using 4 cc of a mixture of dienes consisting of:

ethylidenenorbornene (25 percent), dicyclopentadiene (70 percent) and vinylnorbornene (5 percent).

There were obtained 53.5 g of a product having an inherent viscosity of 2.3 dl/g and a Mooney viscosity of 133.

The copolymer contained, by weight, 40 percent of propylene, 2.2 percent of dicyclopentadiene, and 1 percent of ethylidenenorbornene. In the IR spectrum, moreover, double bonds of the vinyl type were observed.

The polymer was then vulcanized with the same mix and under the same conditions of Example 1. The properties and characteristics of the vulcanized products are set forth in Table III.

TABLE III

| Time, in minutes: | 15 | 30 | 60 | 90 | 120 | 180 | 240 |
|---|---|---|---|---|---|---|---|
| Breaking load, in kg/cm$^2$ | 235 | 214 | 190 | 182 | 195 | 198 | 196 |
| Elongation at break, in % | 670 | 500 | 410 | 375 | 370 | 375 | 370 |
| Elastic modulus at 200%, (kg/cm$^2$) | 34 | 48 | 69 | 72 | 70 | 70 | 67 |
| Elastic modulus at 300%, (kg/cm$^2$) | 69 | 99 | 120 | 135 | 140 | 140 | 141 |
| Residual set, in % | 37 | 17 | 10 | 9 | 10 | 10 | 10 |

As is apparent from Table III, the vulcanization speed is similar to that of the copolymers described in Examples 1 and 2.

EXAMPLE 4

Example 3 was repeated, using, however, 4 cc of a diene mixture consisting of:

ethylidenenorbornene (45 percent), dicyclopentadiene (38 percent),
vinylnorbornene (8 percent), vinylcyclohexene (4 percent) and
tetrahydroindene (5 percent).

The copolymer obtained (49 g) had the following characteristics:

| | |
|---|---|
| Inherent viscosity | 2.1 dl/g |
| Propylene content | 37 % by weight |
| Mooney viscosity | 106 |
| Dicyclopentadiene content | 1.4 % b.w. |
| Ethylidenenorbornene content | 2.2 % b.w. |

Inspection of the IR spectrum revealed, moreover, the presence of double bonds of the vinyl type (absorption bands at 10 and 11 microns).

The copolymer was then vulcanized with the same mix and under the same conditions as in Example 1. The properties and characteristics of the vulcanized products are listed in Table IV:

TABLE IV

| Time, in minutes | 15 | 30 | 60 | 90 | 120 | 180 | 240 |
|---|---|---|---|---|---|---|---|
| Breaking load, in kg/cm² | 234 | 331 | 203 | 204 | 210 | 205 | 202 |
| Elongation at break, in % | 760 | 580 | 440 | 425 | 420 | 400 | 400 |
| Elastic modulus at 200% (kg/cm²) | 25 | 37 | 55 | 59 | 60 | 62 | 60 |
| Elastic modulus at 300% (kg/cm²) | 47 | 77 | 110 | 116 | 125 | 125 | 122 |
| Residual set, in % | 42 | 24 | 12 | 11 | 10 | 10 | 10 |

As appears from the above tabulated data, the vulcanization speed is similar to that of the copolymers described in Examples 1, 2 and 3.

EXAMPLE 5

The reaction apparatus used was a 1 liter capacity glass autoclave fitted with a stirrer and with a thermocouple. Into this autoclave were introduced in the given order:

4 cc of a mixture of dienes consisting of ethylidenenorborne (20 percent), tetrahydroindene (5 percent), dicyclopentadiene (65 percent), and
vinylidenenorbornene (10 percent); 0.3 millimoles of zinc diethyl,
7 millimoles of Al(C₂H₅)₂Cl and 500 cc of propylene.

After the introduction of ethylene to bring the pressure up to 1 atmosphere, there were introduced 0.03 millimoles of vanadium triacetylacetonate dissolved in 1.5 cc of anhydrous toluene. During the polymerization, the temperature was maintained at −20° C. The pressure was maintained constant by continuously feeding ethylene. The polymerization was then interrupted after 40 minutes from the introduction of the vanadium salt.

After removal of the unreacted olefins, the polymer was dissolved in toluene, purified from the catalytic residues and coagulated with a mixture of acetone-methanol. After drying under vacuum, there were obtained 21 g of product.

On infrared (IR) spectrographic analysis, this product was found to contain, by weight, 36.5 percent of propylene, 1.2 percent of ethylidenenorbornene, 2 percent of dicyclopentadiene and 0.6 percent of vinylnorbornene. The Mooney viscosity was 159.

The copolymer was vulcanized with the same mix and under the same conditions as indicated in Example 1, to obtain a vulcanized product having the characteristics set forth in Table V.

TABLE V

| Time, in minutes | 15 | 30 | 60 | 90 | 120 | 180 | 240 |
|---|---|---|---|---|---|---|---|
| Breaking load, in kg/cm² | 237 | 219 | 209 | 187 | 207 | 208 | 207 |
| Elongation at break, in % | 555 | 445 | 380 | 365 | 350 | 345 | 350 |
| Elastic modulus at 200% (kg/cm²) | 45 | 66 | 76 | 81 | 84 | 87 | 88 |
| Elastic modulus at 300% (kg/cm²) | 92 | 123 | 153 | 158 | 168 | 172 | 174 |
| Residual set, in % | 20 | 13 | 11 | 8 | 8 | 6 | 7 |

From the values given in Table V, it appears that the vulcanization speed is similar to that of the copolymers described in the preceding examples.

EXAMPLE 6

This polymerization run was carried out under the same conditions as those indicated in Example 1, using 4 cc of ethylidenenorbornene. There was obtained 46 g of copolymer having an inherent viscosity of 2.3 dl/g and a Mooney viscosity of 129. It contained, by weight, 35 percent propylene and 3.5 percent of ethylidenenorbornene.

The copolymer was vulcanized with the same mix and under the same conditions as in Example 1. The properties and characteristics of the vulcanized products are recorded in Table IV.

TABLE VI

| Time, in minutes | 15 | 30 | 60 | 90 | 120 | 180 | 240 |
|---|---|---|---|---|---|---|---|
| Breaking load, in kg/cm² | 227 | 192 | 186 | 183 | 190 | 186 | 184 |
| Elongation at break, in % | 560 | 440 | 370 | 340 | 350 | 340 | 340 |
| Elastic modulus at 200% (kg/cm²) | 45 | 57 | 81 | 86 | 79 | 80 | 87 |
| Elastic modulus at 300% (kg/cm²) | 87 | 109 | 146 | 162 | 158 | 159 | 166 |
| Residual set, in % | 28 | 20 | 10 | 10 | 8 | 8 | 8 |

As appears from the data tabulated in Table VI, the vulcanization speed and the properties and characteristics of the vulcanized products were similar to those of the copolymers and vulcanizates described in the preceding examples.

EXAMPLE 7

Under the same conditions as described in Example 1, a copolymerization run was carried out using 4 cc of dicyclopentadiene. Thereby were obtained 53.8 g of an amorphous copolymer having an inherent viscosity of 2 dl/g and a Mooney viscosity of 82. The content in propylene was equal to 32 percent by weight while the content in dicyclopentadiene was equal to 3.5 percent by weight.

When the copolymer was vulcanized with the same mix and under the same conditions as those indicated in Example 1, vulcanized products having the properties and characteristics reported in Table VII were obtained.

TABLE VII

| Time, in minutes | 15 | 30 | 60 | 90 | 120 | 180 | 240 |
|---|---|---|---|---|---|---|---|
| Breaking load, in kg/cm² | 190 | 224 | 246 | 216 | 235 | 238 | 236 |
| Elongation at break, in % | 820 | 680 | 590 | 490 | 490 | 480 | 460 |
| Elastic modulus at 200% (kg/cm²) | 18 | 26 | 38 | 44 | 53 | 54 | 56 |
| Elastic modulus at 300% (kg/cm²) | 30 | 52 | 77 | 94 | 106 | 112 | 118 |
| Residual set, in % | 40 | 30 | 24 | 24 | 24 | 14 | 12 |

As appears from Table VII, the vulcanization speed of the copolymer of ethylene, propylene and dicyclopentadiene is much lower than that of the copolymers described in the preceding examples. The values of the elastic modulus at 300 percent continue to grow in time; after 60 minutes the value of the modulus has reached only about 65 percent of the value measured after 240 minutes.

Results similar to those reported in the examples are obtained when other catalyst systems as disclosed herein are used to effect the copolymerization.

In the foregoing examples, the balance of the copolymers obtained was made up of polymerized units of ethylene.

As will be apparent, changes in details may be made in practicing the invention without departing from its spirit. Therefore, we intend to include in the scope of the appended claims all changes and modifications which will be obvious to those skilled in the art from the description and working examples given herein.

We claim:

1. Unsaturated sulfur-vulcanizable copolymers consisting essentially of ethylene, 15 to 50 mol percent propylene, ethylidene norbornene and at least one other diene selected from the group consisting of (1) vinyl norbornene and (2) vinyl norbornene and dicyclopentadiene, said ethylidene norbornene and other dienes being present in amount of 0.1 to 20 mol percent in a molar ratio of ethylidene norbornene to (1) vinyl norbornene and (2) vinyl norbornene and dicyclopentadiene of 10:1 to 1:10, said copolymer having an intrinsic viscosity in tetrahydronaphthalene at 135° C. of greater than 0.5 dl/g.

2. A composition of claim 1 containing above 0.4 mol percent unsaturation wherein the molar ratio of ethylidene norbornene to (1) or (2) is 5:1 to 1:5.

3. A composition of claim 2 consisting essentially of ethylene, propylene, ethylidene norbornene and vinyl norbornene.

4. A composition of claim 2 consisting essentially of ethylene, propylene, ethylidene norbornene, vinyl norbornene and dicyclopentadiene.

5. A composition of claim 2 wherein the copolymer contains about 30 to 40 mol percent propylene and about 3 to 4 mol percent ethylidene norbornene and other dienes.

6. A copolymer of claim 1 in a vulcanized state.

7. A process for the preparation of unsaturated copolymers of ethylene, propylene, ethylidene norbornene and at least one diene selected from the group consisting of (1) vinyl norbornene and (2) vinyl norbornene and at least one of dicyclopentadiene and 4,7,8,9-tetrahydroindene, comprising polymerizing said ethylene, propylene, ethylidene norbornene and other dienes with a catalyst system obtained by mixing (1) at least one hydride or organometallic compound of barium aluminum or lithium aluminum complex with (2) at least one hydrocarbon-soluble vanadium compound at a temperature between −80° C. and 125° C., said ethylene and propylene in the liquid phase being present in a molar ratio between 1:200 and 1:4, and ethylidene norbornene and said other dienes present in amounts to provide 0.1 to 20 mol percent in the copolymer.

8. The process of claim 7 wherein (1) of the catalyst system is selected from the group consisting of aluminum trialkyls and alkyl aluminum halides and (2) is selected from the group consisting of vanadium halides, vanadyl oxyhalides, vanadium alcoholates, vanadyl alcoholates, vanadium halogen-alcoholates, vanadyl halogen-alcoholates, vanadium acetylacetonate, vanadyl acetylacetonate, vanadium halogen-acetylacetonate and vanadyl halogen-acetylacetonates.

* * * * *